No. 622,601. Patented Apr. 4, 1899.
J. W. BRUNS.
HAY OR GRAIN RACK.
(Application filed Feb. 11, 1899.)
(No Model.)
Fig. 1.
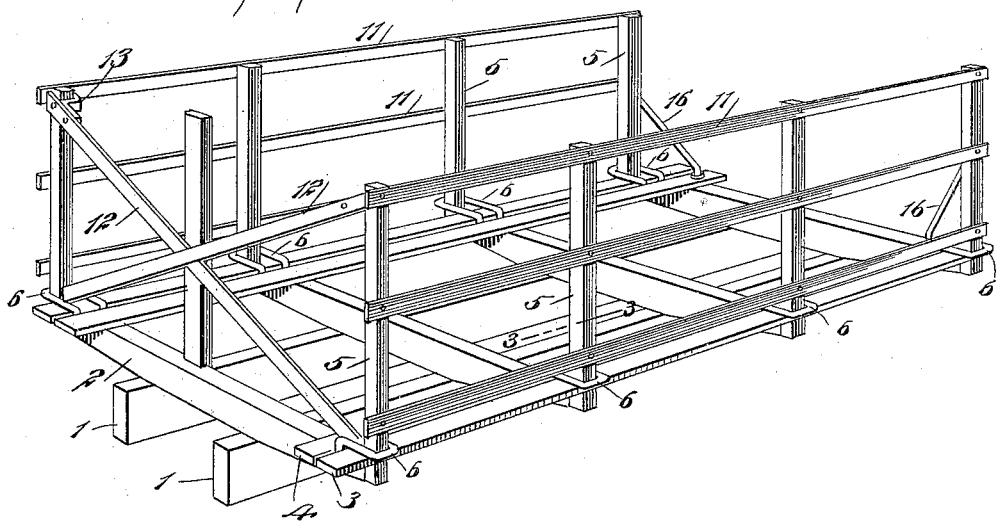
Fig. 2.
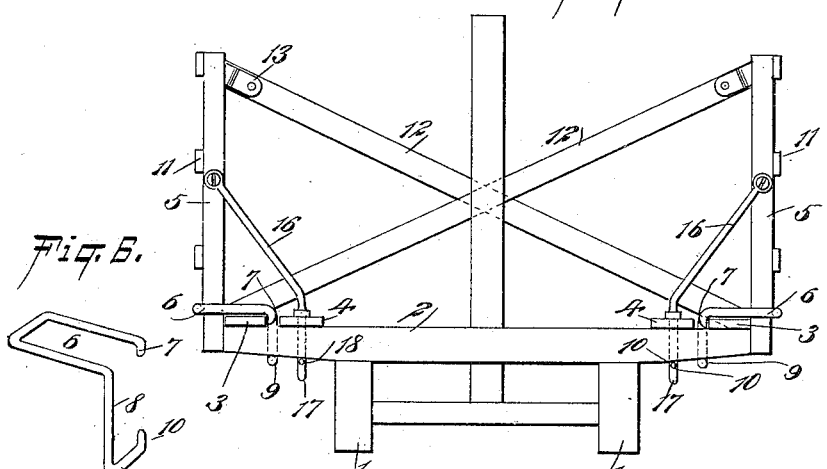
Fig. 6.
Fig. 3.
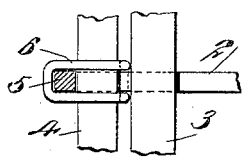
Fig. 4.
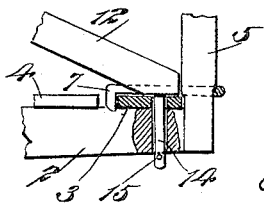
Fig. 5.
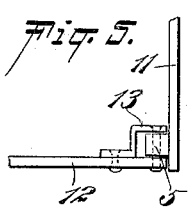
WITNESSES:
William P. Goebel
C. R. Ferguson
INVENTOR
John W. Bruns,
BY
ATTORNEYS.
THE NORRIS PETERS CO., PHOTO-LITHO., WASHINGTON, D. C.

UNITED STATES PATENT OFFICE.

JOHN WILHELM BRUNS, OF FREMONT, IOWA.

HAY OR GRAIN RACK.

SPECIFICATION forming part of Letters Patent No. 622,601, dated April 4, 1899.

Application filed February 11, 1899. Serial No. 705,299. (No model.)

*To all whom it may concern:*

Be it known that I, JOHN WILHELM BRUNS, of Fremont township, in the county of Fayette and State of Iowa, have invented a new and Improved Hay or Grain Rack, of which the following is a full, clear, and exact description.

This invention relates to improvements in hay or grain racks for wagons; and the object is to provide a simple and strong box-rack and means by which it may be quickly and readily attached to or removed from the ordinary bed-rack of a hay or grain wagon without employing threaded bolts and nuts or screws.

I will describe a hay or grain rack embodying my invention and then point out the novel features in the appended claims.

Reference is to be had to the accompanying drawings, forming a part of this specification, in which similar characters of reference indicate corresponding parts in all the views.

Figure 1 is a perspective view of a hay or grain rack embodying my invention. Fig. 2 is a rear end elevation thereof. Fig. 3 is a section on the line 3 3 of Fig. 1. Fig. 4 is a detail showing a means of securing the lower ends of the front braces employed. Fig. 5 is a detail showing the means for attaching the upper ends of said braces, and Fig. 6 is a perspective view of one of the removable socket-loops employed.

Referring to the drawings, 1 designates the sills, and 2 the cross-beam, of an ordinary rack for a hay or grain wagon, and upon the upper sides of these cross-beams 2 at the ends are placed the ordinary longitudinal strips 3 4.

In carrying out my invention I employ socket-loops for the uprights or standards 5 of the vertical side racks. These socket-loops comprise hook portions 6, which when in place have their end bars projected outward beyond the outer edges of the strips 3, so that the uprights or standards 5 may be placed between said end bars and the outer edges of the strips 3. The loop has a short downwardly-extended portion 7 to engage against the inner edge of the strip 3, and it also has a downwardly-extended portion 8, a horizontally-extended portion 9, and a short vertically-extended portion 10. The portion 8 will engage against the inner edge of the strip 3 and against one side of a cross-beam 2, while the portion 9 engages the under side of said cross-beam and the portion 10 engages the opposite side. It is obvious that while this socket-loop may be easily placed in position or removed it will form a practically-solid keeper for the upright or standard when said standard is in position.

The several standards 5 have rack-strips 11 secured to them, so that the standards and strips form vertical side racks. The side racks are braced at the front against outward pressure by means of crossed brace-bars 12. The crossed brace-bars 12 are secured to the upper ends of the front standards or uprights 5 by means of pins or bolts passing through said braces and through the uprights and also through metal straps 13, which are attached to the braces. On the lower end of each brace 12 is a pin 14, adapted to be passed through an opening in the strip 3 and also through an opening in the cross-beam 2, and to prevent the upward movement of the braces 12 cross-pins 15 are inserted through perforations in the lower ends of the pins 14 at the under side of the cross-beam 2. The side racks are braced at the rear end by means of brace-rods 16, which are secured to the rear end uprights or standards 5 and have portions 17 adapted to pass through openings in the rear cross-beam 2, and pins 18 are inserted through the openings in said downwardly-extended portion below the cross-beam to prevent an upward movement of the braces 16. These braces 16, it should be noted, are quite short, or, in other words, do not extend far inward on the cross-beam 2. Therefore they will not interfere with the loading of the rack from the rear end.

Having thus described my invention, I claim as new and desire to secure by Letters Patent—

1. In a hay or grain rack, the combination with the cross-beams and longitudinal strips of a base-rack, of socket-loops, each socket-loop having a main portion resting on a longitudinal strip, a short portion to engage against the inner edge of the longitudinal strip, a longer portion to engage the inner side of said strip and against the side of a cross-beam, and also having a portion to engage the under side of said cross-beam and against the opposite side of the cross-beam, whereby said socket-loop may be placed or removed without dismembering the base-rack, and such racks having standards to engage in the loops, substantially as specified.

2. The combination with a base-rack, of socket-loops engaging therewith, side racks having standards for engaging in said loops, crossed braces connected to the upper ends of the forward standards, pins on the lower ends of the braces for passing through openings in the front end cross-beam of the base-rack, and brace-rods connecting with the rear standards and having portions passing through openings in the rear cross-beam of the base-rack, substantially as specified.

JOHN WILHELM BRUNS.

Witnesses:
E. M. KIERON,
THOS. BECHER.